United States Patent [19]

Ge et al.

[11] Patent Number: 5,510,915
[45] Date of Patent: Apr. 23, 1996

[54] OUT-ACTIVE-MATRIX-LCD

[76] Inventors: Shichao Ge; Xi Huang, both of 1516 Chihong Dr., San Jose, Calif. 95131-2401; Xiaoqin Ge, Hangda Xincum, Hangda Road, Bld. 28, No. 64-30, Hanzhou, 310007, China

[21] Appl. No.: 283,616

[22] Filed: Aug. 2, 1994

[51] Int. Cl.$^6$ ............................................. G02F 1/1343
[52] U.S. Cl. .................. 359/59; 359/57; 359/58; 359/88
[58] Field of Search ........................... 359/57, 58, 59, 359/88

[56] References Cited

U.S. PATENT DOCUMENTS

| | | | |
|---|---|---|---|
| 4,145,120 | 3/1979 | Kubota | 359/88 |
| 4,907,862 | 3/1990 | Suntola | 359/48 |

FOREIGN PATENT DOCUMENTS

| | | | |
|---|---|---|---|
| 2067688 | 5/1988 | European Pat. Off. | 359/88 |
| WO9110223 | 7/1991 | WIPO | |

*Primary Examiner*—Anita Pellman Gross
*Assistant Examiner*—Fetsum Abraham
*Attorney, Agent, or Firm*—Shichao Ge; Xi Huang; Xiaoqin Ge

[57] ABSTRACT

A new kind of Active-Matrix LCD, called Out-Active-Matrix LCD (" OAM-LCD"), is formed by depositing the active-matrix on the outside surface of the LCD substrate. Each active component is connected with a related dot electrode of the LCD cell through thin conductive lead, which is hidden in the substrate. This OAM-LCD not only makes the large screen LCD feasible, but also is easy to manufacture. The OAM-LCD can use transmission LC or scattering LC. This new OAM-LCD can be used for making large screen hang-on-wall TV, and super large screen mosaic video display both indoor and outdoor applications. OAM-LCD's features include high brightness, high efficiency, good color quality, long lifetime, low cost and high contrast, especially under high ambient illumination, such as trader direct sunlight.

62 Claims, 6 Drawing Sheets

OUT-ACTIVE-MATRIX-LCD

BACKGROUND OF THE INVENTION

The Active-Matrix-LCD (AM-LCD), including Thin Film Transistor LCD (TFT-LCD) and Thin Film Diode LCD (TFD-LCD), is currently the major technology of the flat panel color video display. The conventional AM-LCD, especially TFT-LCD, has been widely used in lap-top computers and pocket color Tvs.

The active matrix of the conventional AM-LCD are deposited on the internal surface of the LCD cell substrate, using multi-mask steps vacuum technology. This kind of AM-LCD is named as Internal-Active-Matrix-LCD (IAM-LCD).

However, this conventional AM-LCD has some major limitations. For instances, use of IAM-LCD in large screen display (>20") is difficult as its applicability is limited only to smaller display screen sizes. In addition, IAM-LCD is difficult to manufacture, because of high processing cost for active matrix and high capital equipment investment. Furthermore, screen display employing IAM-LCD usually demonstrates certain drawbacks such as low brightness and low efficiency due to the low transmittance of color filter, smaller aperture, and polarizers.

The above-mentioned limitations, however, can be overcome by having the active matrix deposited on, instead of the internal surface, the outside surface of LCD substrate. The resulting product is called Out-Active-Matrix LCD (OAM-LCD) which possesses a series of attractive features previously unavailable to IAM-LCD. Briefly, these features include: (1) OAM-LCD is feasible for the manufacture of large screen LCD (i.e., 20"~1000"or more); (2) OAM-LCD is easier to make due to lower processing cost, simple manufacturing process and the use of screen printing technology which eliminates vacuum mask steps, rendering the product defect-free; (3) OAM-LCD can be used in both indoor and outdoor applications due to its high level of brightness and high contrast property under high ambient illumination even at direct sunlight; (4) OAM-LCD demonstrates a high level of efficiency as it uses larger apertures without the need of color filter arrays and polarizers; and (5) OAM-LCD can be used with screen made entirely of plastic which is safer and easier for handling, especially for large screen and super large screen display.

It is therefore an object of the invention to provide an Out-Active-matrix-LCD processing the above-described features suitably used for large screen display.

SUMMARY OF THE INVENTION

One aspect of this invention is to simplify the manufacture of the LCD and to make the large screen LCD feasible. In order to accomplish this goal, the active matrix is deposited on the outside surface of the LCD substrate. Each active element of the active matrix is connected with a related LCD cell electrode through a thin conductive lead, which is hidden within the substrate. The active matrix can be made using screen printing technology and the conventional electronic devices or the wafers. It enables the active matrix to perform a series of high level characters which can enhance the characteristics of the LCD. It further simplifies the LCD manufacturing process.

An additional aspect of the invention is to provide for an OAM-LCD capable of using either a transmission LC ("TOAM-LCD) or a scattering LC ("SOAM-LCD"). The OAM-LCD can also be made as reflective LCD or transmission LCD. Therefore, for the purpose of illustration, the Active-Matrix LCD including the conventional AM-LCD can be classified as follows:

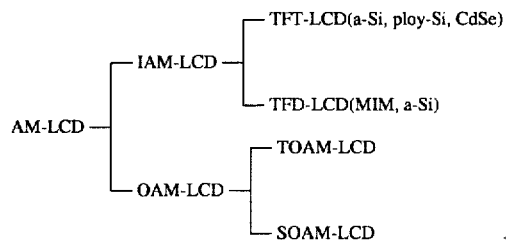

Another aspect of this invention is directed towards the full-color hang-on-wall TV. This type of TV generally requires the use of a relatively larger screen (>20"). The conventional AM-LCD, however, is not suitable for such use as it can be used only for small size display due to the difficulties including some technology and financial limitations. The development of OAM-LCD as described by the invention makes the large screen display (>20") feasible.

Yet another aspect of this invention is directed towards the mosaic large screen and supper large screen video display. It has a very high level of brightness and contrast even under direct sunlight.

One more aspect of this invention is directed towards the fast LCD. Because the out-active-matrix cm be constructed using the conventional electronic devices, which tolerate a higher level of operating voltage (i.e., such as from 5 to 500 v or more), the fast LCD is therefore easier to obtain to achieve video response time.

Yet another aspect of this invention is directed towards the micro-power consumption reflective OAM-LCD, especially under high ambient illumination field. The reflective OAM-LCD can also be used for multi-color and full-color displays.

DETAILED DESCRIPTION OF THE PREFERRED EMBODIMENT

Figure 1:
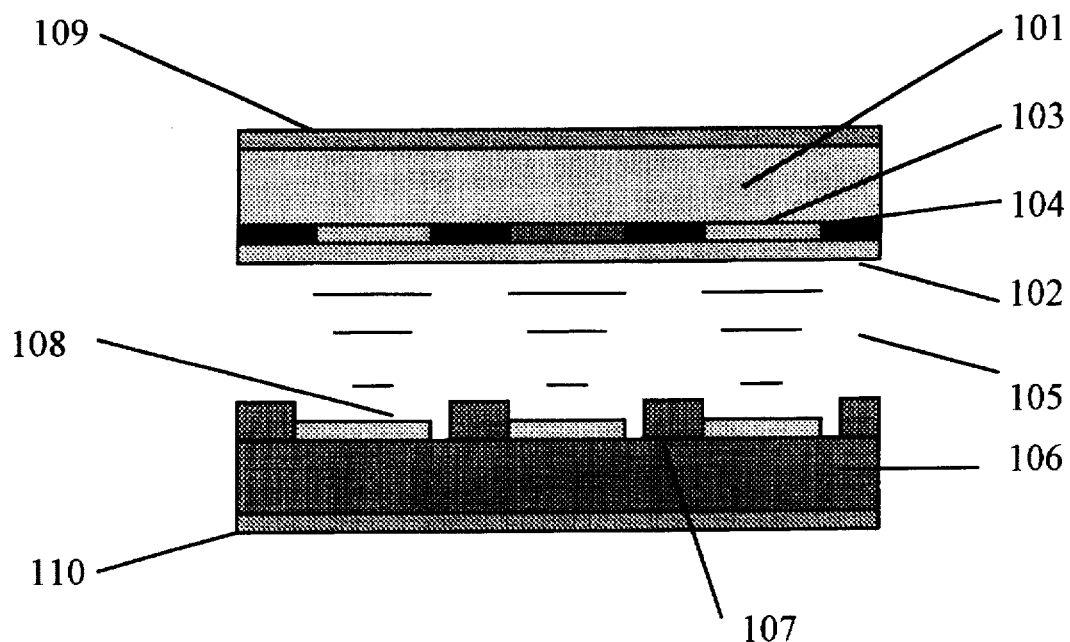
FIG. 1 is a cross-sectional view of a portion of a conventional AM-LCD.

For the purposes of comparison and illustration, a cross-sectional view of a portion of prior art AM-LCD is illustrated in FIG. 1. 101 is a transparent face plate of LCD. 102 is a transparent electrode. 103 is a R (red), G (green), and B (blue) filter array. 104 is a black matrix. 102, 103 and 104 are deposited on the internal surface of the face plate 101. 105 is a LC layer. 106 is a back plate of the LCD. 107 is an Active-Matrix (AM) for driving LCD, deposited on the internal surface of the back plate 106. The active matrix can be a TFT array, such as a-Si TFT, poly-Si TFT or CdSe TFT, or a TFD array, such as MIM diode or a-Si diode. 108 is a back transparent electrode of a LCD cell. 109 and 110 are polarizers.

As shown in FIG. 1, the active-matrix 107 is deposited on the internal surface of the substrate, and thus can be called Internal-Active-Matrix LCD (IAM-LCD).

Figure 2:
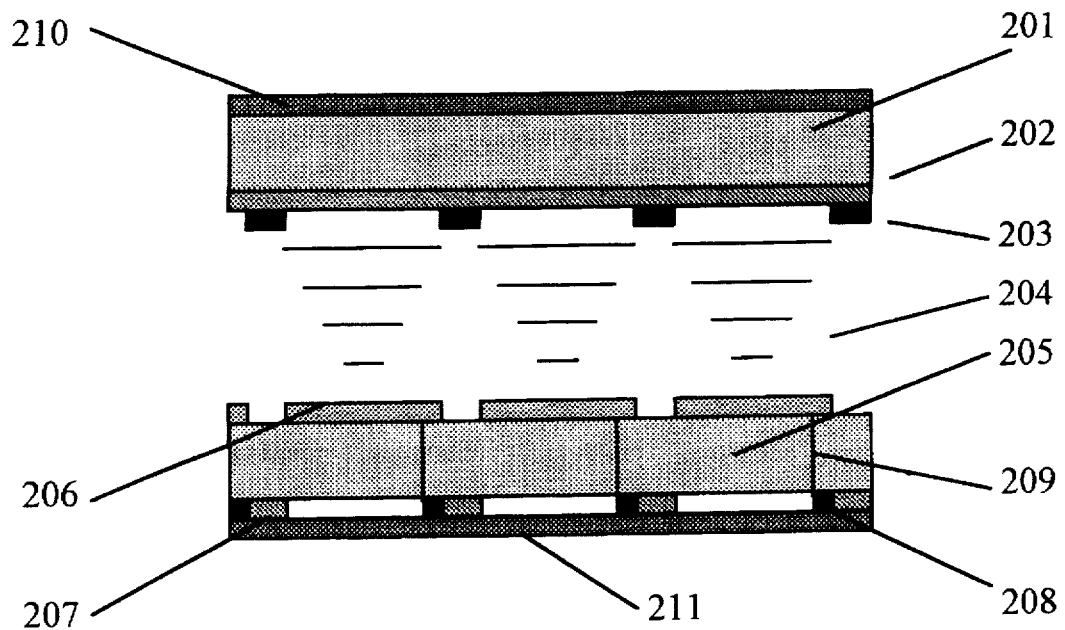
FIG. 2 is a cross-sectional view of a portion of an OAM-LCD of this invention.

Referring now to FIG. 2, there is shown a cross-sectional view of a portion of the OAM-LCD of this invention. 201 is a face transparent substrate. 202 is a transparent electrode deposited on the internal surface of the face substrate. 203 is a black matrix. 204 is a LC layer. 205 is a back substrate of LCD. On the internal surface of the back substrate 205, a separated transparent electrode array 206 is deposited. The said separated electrode array 206 and the said transparent electrode 202 form a display matrix. On the outside surface of said back substrate, an out-active-matrix 207 and a series of conductive leads 208 are deposited. The out-active-matrix 207 and the conductive leads 208 are located immediately adjacent to each other. The out-active-matrix 207 comprises transistors, diodes, thick film circuits, thin film circuits, or hybrid circuits. The conductive leads 208 are extended further from the outside surface of the back substrate toward the interior portion of the back substrate, to form a series of hidden thin conductive leads 209. Each of the thin conductive leads 209 has two connecting ends. One of the connecting end is connected with a related transparent dot electrode 206, and the other is connected with the conductive lead 208 through which the thin conductive lead makes connection with the out-active-matrix 207, 210 and 211 are polarizers.

In order to obtain a high reliability of the connection of the thin conductive leads 209 and the out-active-matrix 207, a certain number of multi-thin conductive leads can be used for each dot electrode 206.

Since the out-active-matrix 207 is deposited on the outside of the back substrate 205, a list of high quality components, e.g., high operating voltage such as 15 to 500 volts, and certain high speed components can be incorporated into the LCD driving so as to achieve a fast response time (e.g., video speed) for the LCD.

Figure 3:
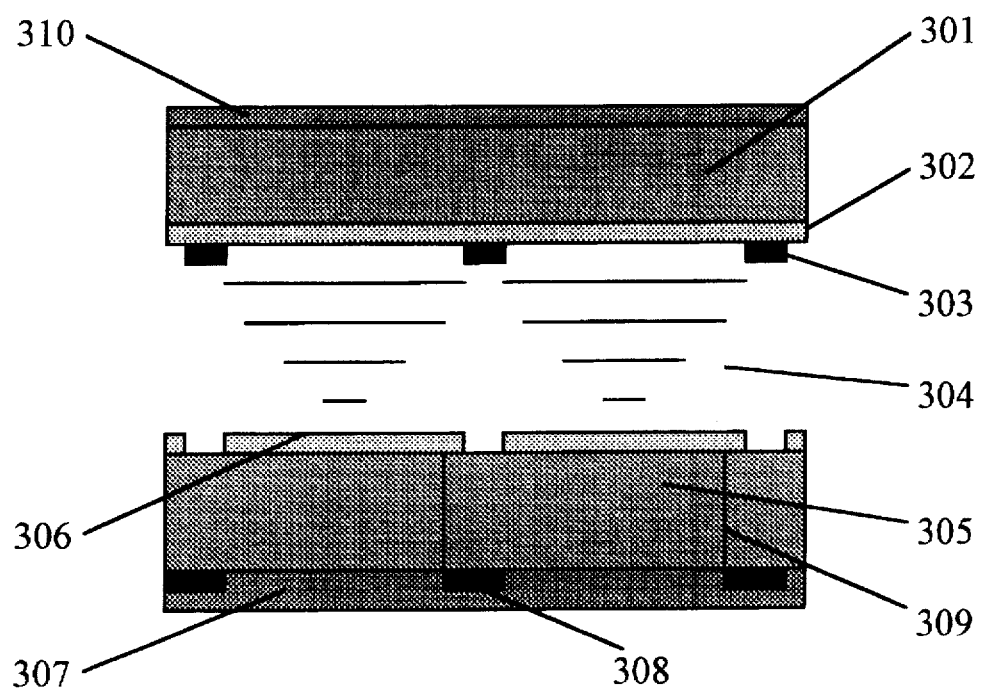
FIG. 3 is a cross-sectional view of a portion of a reflective OAM-LCD.

Referring now to FIG.3, a cross-sectional view of a portion of a reflective OAM-LCD is shown. 301 is a face transparent substrate of the LCD. 302 is a transparent electrode deposited on the face substrate 301. 303 is a black matrix formed on the face substrate. 304 is a LC layer. 305 is a back substrate of LCD. On the internal surface of the back substrate 305, a separated reflective dot electrode array 306 is deposited. The said separated electrode array 306 and the transparent electrode 302 form a display matrix. On the outside surface an out-active-matrix 307 and a series of conductive leads 308 are deposited. Within the back substrate, a series of thin conductive leads 309 are hidden. Each of the thin conductive leads 309 has two connecting ends. One of which is connected with one of the related reflective dot electrodes 306, and the other is connected with one of the conductive leads 308, through which the thin conductive leads make connection with the out-active-matrix 307. 310 is a polarizer.

In order to install the active matrix circuit and the conductive leads, a single layer of or multi-layers of PCB can be used on the outside surface of the back substrate 305.

Figure 4:
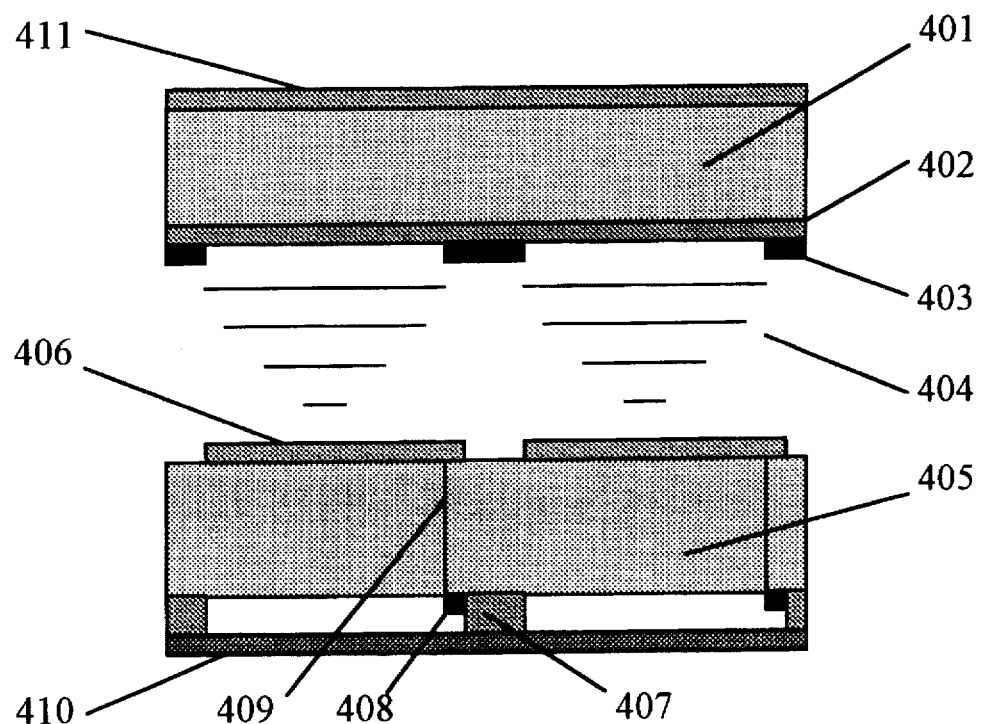
FIG. 4 is a cross-sectional view of a portion of a different type of reflective OAM-LCD as illustrated in FIG. 3.

Referring to FIG.4, there is shown a cross-sectional view of a portion of a reflective OAM-LCD which is an variant of that shown in FIG. 3. 401 is a transparent face substrate of LCD. 402 is a transparent electrode deposited on the internal surface of the face substrate 401. 403 is a black matrix. 404 is a LC layer. 405 is the back substrate of LCD. On the internal surface of the back substrate 405, a separated transparent dot electrode array 406 is deposited. The said separated electrode array 406 and the said transparent electrode 402 form a display matrix. On the outside surface of the back substrate 405, an out-active-matrix 407 and a series of conductive leads 408 are deposited. The out-active-matrix 407 and the conductive leads 408 are seated at the gap between the dot electrodes 406. Within the back substrate 405 a series of thin conductive leads 409 are hidden. Each of the thin conductive leads 409 has two ends and one of which is connected with a related dot electrode 406, and the other end is connected with the conductive lead 408, and then connected to the out-active-matrix 407. 410 is a reflective plate, on its internal surface a high reflective material is coated to form a black-white display. If the monochromic fluorescent material or the color fluorescent materials are coated on the internal surface of the reflective plate 410, a monochromic display or the multi-color and full-color displays can be obtained. 411 is a polarizer.

Figure 5:
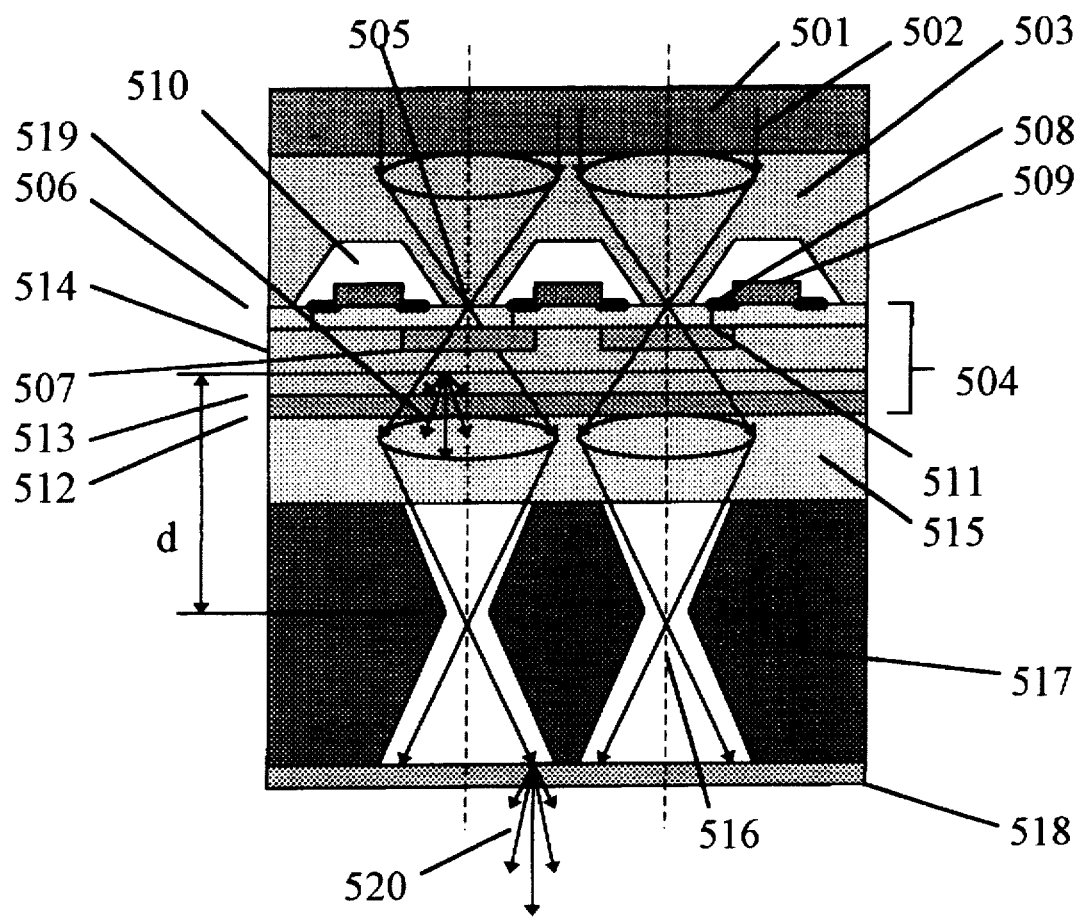
FIG. 5 is a schematic view of a scattering OAM-LCD.

FIG. 5 is a cross-sectional view of a portion of a scattering OAM-LCD. 501 is a parallel light backlight to emit an array of parallel light 502. 503 is a focusing lens array plate having a series of equally-spaced focusing lens. 504 is a scattering LCD, e.g. PDLCD (Polymer-Dispersed LCD) (or LCPC (Liquid Crystal and Polymer Composite), NCPT (Nematic-Cholesteric Phase-Transition) and, PNLC (Polymer-Network LCD) etc.), called OAM-PDLCD. The parallel light 502 emitted from backlight 501 are focused on the outside surface 505 of the LCD substrate 506 by the focusing lenses 503. On the internal surface of the back substrate 506, a separated transparent electrode array 507 is deposited. On the outside surface of the back substrate 506 a series of conductive leads 508 are deposited, and an out-active-matrix 509 is also deposited. 510 is a series of chambers formed in the focusing lens plate 503 between the focus points to hold the components of the active-matrix 509. Because the focus points are very small, the most part of the outside surface area of the back substrate 506 between the focus points can be used for installing the components of the out-active-matrix and the conductive leads, so that the high quality components and devices, such as high operating voltage and high speed devices, can be used to obtain high quality and fast response time of LCD. For example, the operating voltage ranging from 5 to 500 volts, the video speed of LCD response time can be obtained. Within the back plate 506, a series of thin conductive leads 511 are hidden. Each of the thin conductive leads has two ends and one of which is connected with a related separated electrode 507, and the other is connected with the conducive lead 508 and then with the out-active-matrix 509. 512 is another substrate of the LCD. 513 is the transparent electrode deposited on the substrate 512. The said transparent electrode 513 and the said separated electrode array 507 form a display matrix. 514 is a LC layer. 515 is a projection lens plate, which have a series of projection lenses, located at the front of the LCD 504. 517 is an aperture array plate, which have a series of apertures, located at the front of the projection lens plate 515. 518 is a face plate, which has some optical structure, such as holographic film and/or lens array, used for adjusting the viewing angle and the direction of the output light 520, and for obtaining a high contrast display image. The apertures are respectively aligned with the related projection lenses, focusing lenses and separated dot electrodes in the same optical axis.

When an ON operating voltage is applied to the LCD. The LCD is changed to the transparent state. The light 502 emitted from the backlight 501 can go through the LCD smoothly, and then to the projection lens array 515, then focused on the aperture 516, which is at the black aperture array plate 517. In this case, the light can go through the aperture 516 smoothly, and then go through the face plate 518. That is the ON-state of the display.

When the OFF operating voltage is applied to the LCD 504. The LCD is changed to the scattering state. The incident light will be scattered by the LCD as shown in 519. In this case, the most part of the scattering light will be absorbed by the black aperture plate, and only a small part can go through the small aperture 516 and output from the face plate 518. On the other hand, the incident light to the face plate 518 from the ambient illumination can be absorbed fully by the black aperture array plate 517, and only a very small part of the incident light can go through the small aperture 516 and further reflect from LCD and then go through the small aperture again before being output from the face plate 518. Therefore, this process renders the background brightness of the display extremely low while retaining a very high contrast especially under the high ambient illumination, such as under direct sunlight. In addition, the black aperture plate 517 can absorb the incident light including UV light and hence prolongs the lifetime of the LCD.

The contrast of this OAM-LCD also depends on the optical characteristics of LCD and the optical system of the display. In order to obtain a level of high contrast, the ON-state LCD transmittance should be high and the diffusing effect of OFF-state LCD should be large (large diffusing angle), and to form a good parallelism of the light emitted from backlight. To accomplish this goal the optical system should allow the light to go through the ON-state LCD and to be focused on a very small point, and then to go through the small aperture 516 smoothly. The aperture 516 should be as small as possible ranging from ½ to 1/100 of the pixel pitch. The distance d between LCD and aperture should be larger ranging from 1/10 to 100 times of the pixel pitch.

In order to obtain the high contrast, a black dye can be mixed in the LC material. When the LCD is at OFF state (scattering state), the LC layer will be darken because the black dye, and hence the background brightness of the OFF state will be decreased.

The LCD, e.g., PDLCD, has the capacity of performing analogy modulation (i.e., the analogy modulation method). In this case, the transmittance of LCD, and thus the intensity of the output light, is dependent on the data signal.

The parallel light backlight 501 may comprise a point light source and a parabola or ellipse reflector and/or a Fresnal lens or a lens plate and IR, UV absorbing plate. The parallel light backlight 501 may further comprise a line light source and a parabola or ellipse cylinder reflector and/or a Fresnal lens or a lens plate. The line light source can be the cold cathode or hot cathode fluorescent lamp. Preferably, the aperture of the aperture plate may be a series of slits. These slits are paralleled with the line light sources. One display system can have one or more such backlights.

In addition, the point light source and the line light source can be comprised the R, G, and B color point light sources and/or the R, G, B line light sources, which can be arranged in one system to generate the red, green, and blue pulse light sequentially according to the display signal, and, consequently, generates the full-color image without a color filter.

The parallel light backlight 501 can also comprise a scattering light source, e.g., some hot cathode or cold cathode fluorescent lamps with reflector and diffuser, and a holographic film or an optical fiber plate. The scattering light from the diffuser can change parallel light through the holographic film or the optical fiber plate.

In addition, if the backlight consists of several light sources, in order to obtain the uniform brightness of the display image, there is a brightness auto-adjust circuit for adjusting the brightness uniformity.

Figure 6:
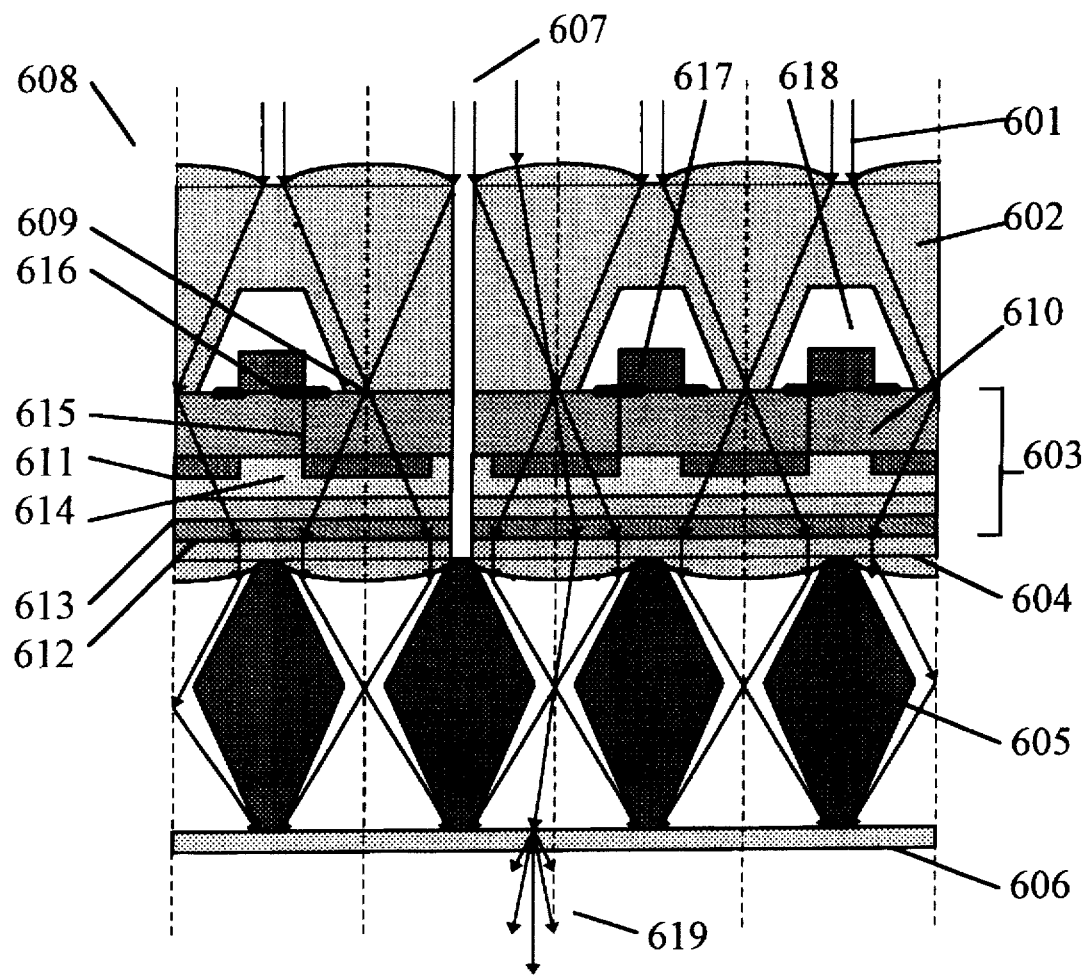
FIG. 6 is a cross-sectional view of a portion of a mosaic large screen OAM-LCD.

FIG. 6 is a cross-sectional view of a portion of a mosaic large screen display made of scattering OAM-LCD, e.g., PDLCD. 601 is a parallel light emitted from the backlight. 602 is a focusing lens array. 603 is the PDLCD. 604 is a projection lens array plate. 605 is a black aperture array plate. 606 is a face plate of the display.

The parallel light 601 is refracted by the focusing lens 602, then focused at the out side surface 609 of a transparent back substrate 610 of the PDLCD 603. 611 is a separated electrode array deposited on the internal surface of the back substrate 610. 612 is another transparent substrate of the PDLCD. 613 is a transparent electrode deposited on the internal surface of the other substrate 612. The electrode 613 comprises a series of parallel electrode strips. The electrode 613 and the separated electrode array 611 form the display matrix. 614 is a PDLC layer.

Within the back substrate 610, a series of thin conductive leads 615 are hidden. Each of the thin conductive leads 615 has two connecting ends and one of which is connected to a related separated transparent electrode 611, and the other is connected with the conductive lead 616 deposited on the outside surface of the back substrate 610 and then to the out-active-matrix 617. The out-active-matrix 617 comprises diodes, transistors, thick film circuits, thin film circuits or hybrid circuits.

Because the incident parallel light 601 is focused on the outside surface 609 of the back substrate 610, the most part of this exterior surface area of the substrate can be used for depositing the conductive leads 616 and for installing the active matrix components, and the focusing lens array plate 602 can make a series of chambers 618 to hold the active matrix components.

When the PDLCD is at ON state, the parallel incident light 601 can go through the focusing lens 602, PDLCD 603, projection lens 604 and aperture 605, and then output from the face plate 606 shown as 619. When the PDLCD is at OFF state, the incident light 601 will be scattered by the PDLCD 603 and then absorbed by the black aperture plate 605.

For super large screen display, the display screen can be assembled by many mosaic display tiles 608. There exists a assembly gap 607 between the tiles. In this regard, the aperture plate 605 and the face plate 606 can be assembled separately in the same manner as the tiles, or, alternatively, they can be assembled as a continuous structure for one display screen as shown in FIG.6 as 605 and 606.

For the color display, the R, G, B color filter array can be deposited on the internal surface or the outside surface of the LCD substrate or on the focusing lens array plate, projection lens array plate, aperture plate, to display multi-color or full-color image.

For the color display, the R, G, and B color sequential pulse backlight can also be used. In this case the video signal is divided into R, G and B three sub-fields, and the LCD is divided into some groups, each of the groups has certain number of lines. The LCD is addressed line by line. When a group of lines are addressed and when the transmission saturation state of the LCD cells of the group is reached, the R (or G, or B depending on the signal color of the sub-field) backlight is flash to display the red sub-field image. In this way, the addressing of a sub-field is finished group by group. When the addressing of one sub-field is completed, the same procedures will be repeated to start the next sub-field addressing and backlight flashing to display the full-color image. In this case, the color filter is no needed. The resulting LCD will possess a high level of brightness and efficiency.

Figure 7:
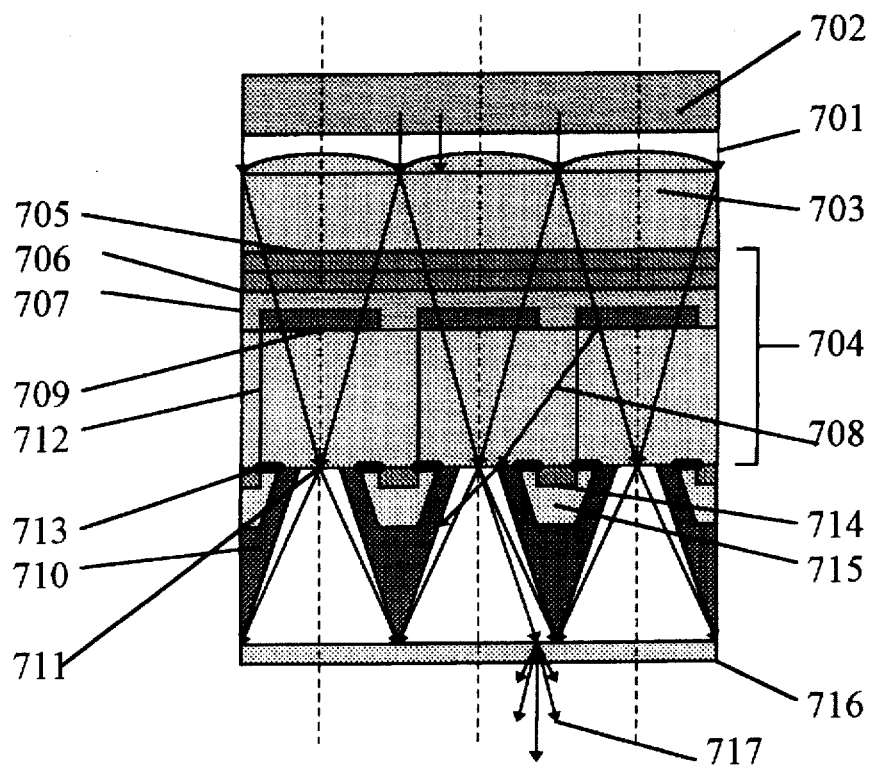
FIG. 7 is a cross-sectional view of a portion of a different type of scattering OAM-LCD as illustrated in FIG. 5.

FIG. 7 is a cross-sectional view of a different scattering OAM-LCD, where only one lens is used for one image dot, called one lens system. 701 is a parallel light from the backlight 702. 703 is a focusing lens plate. 704 is a scattering LCD, e.g., PDLCD. 705 is a transparent back substrate of the LCD. 706 is a series of transparent electrodes deposited on the internal surface of the back substrate 705. 707 is a LC layer. 708 is a transparent face substrate of the LCD. 709 is a separated transparent electrode array deposited on the internal surface of the face substrate 708. The said separated electrode array 709 and the transparent electrode 706 form the display matrix. 710 is a black aperture array plate having a series of apertures 711. The parallel light beams 701 emitted from the backlight 702 are focused on the outside surface of the face substrate 708 of LCD by focusing lens 703. Within the face substrate 708 of LCD, a series of thin conductive leads 712 are hidden. Each of the thin conductive leads 712 has two connecting ends and one of which is connected to a related separated electrode 709, and the other is connected with the conductive leads 713 and then to the out-active-matrix 714. 715 is a series of chambers formed on the aperture plate 710 between the focusing points, to hold the components of the out-active-matrix 714. 716 is a face plate of the display. In order to simplify the structure of the display, the face plate 716 can be no used. In this case, the black aperture plate 710 is also the face plate of the display. The structure of this system is very simple, there is only one lens for one image dot, and can be called one lens system.

Figure 8:
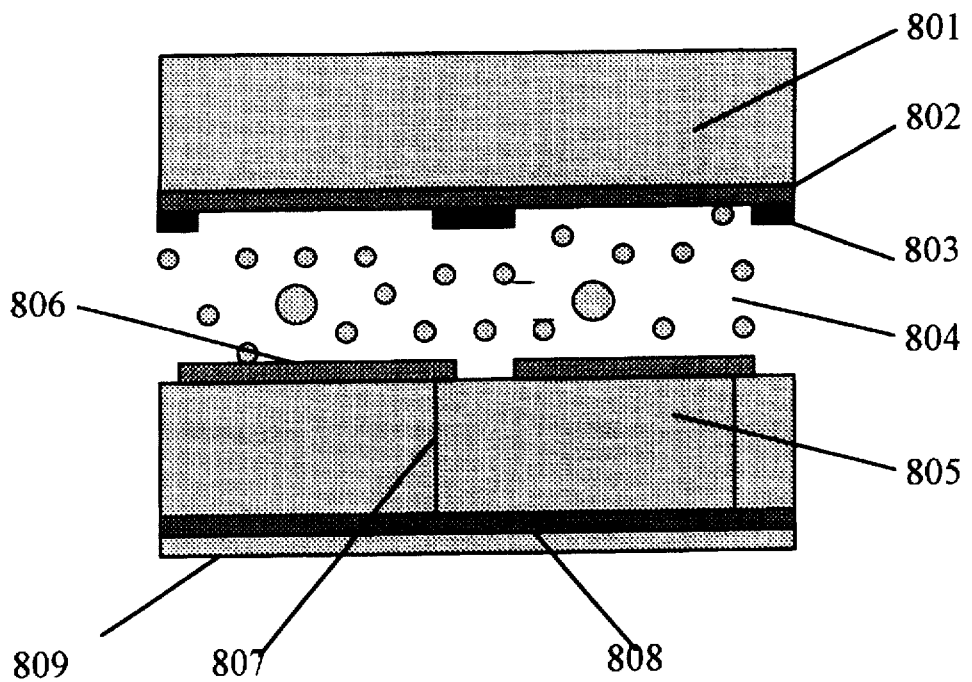
FIG. 8 is a cross-sectional view of a portion of a reflective OAM-PDLCD.

FIG. 8 is a cross-sectional view of a portion of a reflective OAM-PDLCD. 801 is a face substrate of the display. 802 is a transparent electrode deposited on the internal surface of the face substrate 801. 803 is a black matrix. 804 is a PDLC layer. 805 is a back substrate. On the internal surface of the back substrate 805, a series of separated reflective electrodes 806 are deposited. The said separated electrodes and the transparent electrodes 802 form a display matrix. Within the back substrate 805, a series of thin conductive leads 807 are hidden. On the outside surface of the back substrate 805, a conductive lead plate 808 is installed. The said plate 808 can be a single-layer or a multi-layer PCB. 809 is an out-active-matrix installed on the outside of the PCB 808. It is connected with the related separated electrode 806 through the lead plate 808 and the thin conductive leads 807 and to drive the LCD.

In order to increase the contrast, a layer of high reflective material or a fluorescent material can be deposited on the surface of the reflective electrode 806. If certain different color fluorescent materials are used, the multi-color or full-color display can be obtained. In addition, the reflective electrodes can also be the black electrodes. In this case, when the PDLCD is at transparent state, the display is black, and when the PDLCD is at scattering state, the display is white. It can also display the black/white image.

Figure 9:
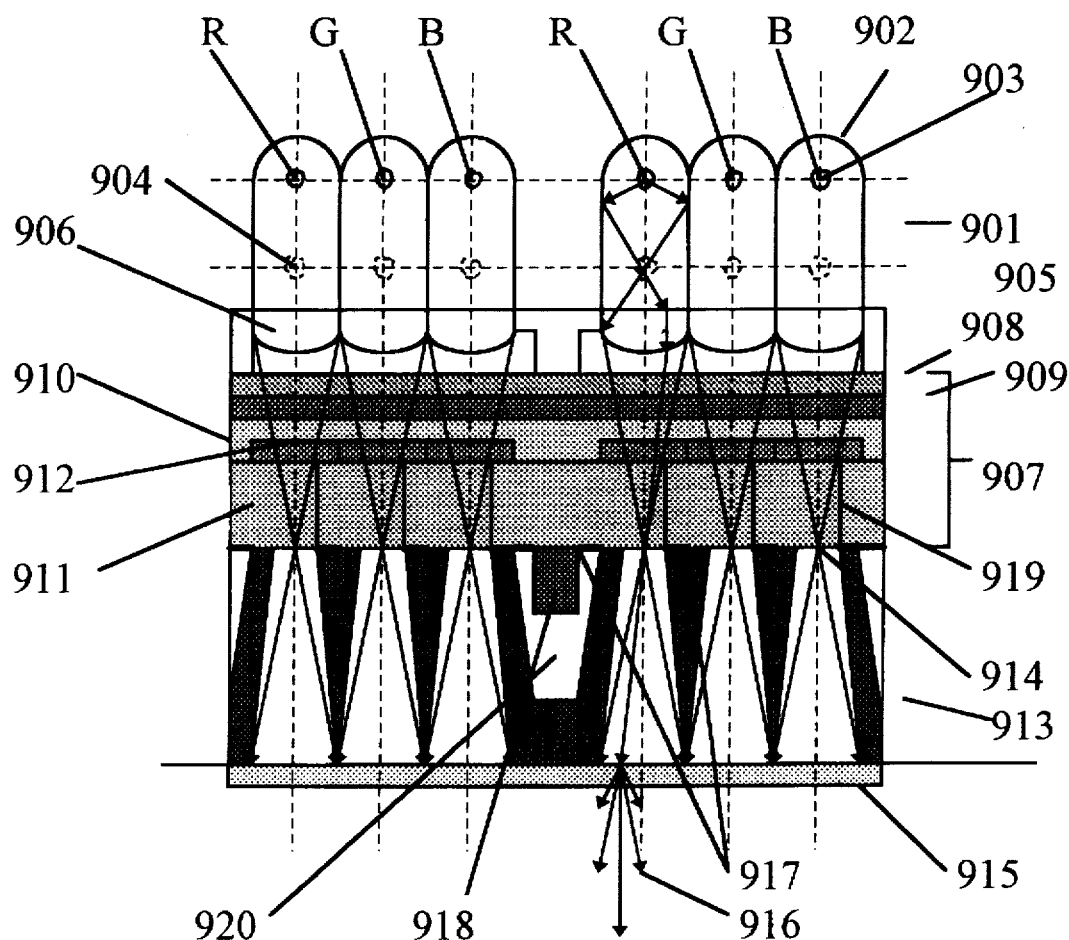
FIG. 9 is a schematic view of a different type scattering OAM-LCD.

FIG. 9 is a cross-sectional view of a different scattering OAM-LCD, where one line image dot has one line light source. FIG. 9 shows a full-color display. 901 is a backlight. 902 is the ellipse or parabola cylinder reflector. 903 is R, G, and B line light sources, e.g., hot cathode or cold cathode fluorescent lamp, located at the focus point of ellipse or parabola. 904 is the image of light source by ellipse reflector. 905 is a focusing lens plate having a focusing lens array 906. 907 is a scattering LCD, e.g., PDLCD. 908 is a back substrate of LCD. 909 is a series of transparent electrodes deposited on the internal surface of said back substrate. 910 is the LC layer. 911 is the face substrate of LCD. 912 is a separated transparent electrode array deposited on the internal surface of said face substrate. The said separated electrode array 912 and the transparent electrodes 908 forms the display matrix. 913 is a black aperture plate having an aperture array 914. The incident light emitted from backlight 901 are focused on the outside surface of face substrate 911. 915 is a face plate of display having some optical structure for adjusting the viewing angle and direction of the output light 916 and for obtaining the high contrast of the image. 917 is a series of conductive leads deposited on the outside surface on the face substrate 911 between focus points and R, G, B line groups. 918 is an out-active-matrix located on the outside surface of face substrate 911 between focus points or R, G, B line groups, and connected with conductive leads 917. 919 is a series of thin conductive leads hidden in the face substrate 911. Each thin conductive lead 919 has two connecting ends, one of which is connected to a related separated electrode, and the other end is connected with the conductive lead 917 and then to the out-active-matrix 918. 820 is a series of chambers in the black aperture plate 913 between R, G, B line groups or/and focus point neighboring LCD. This structure can be used for making super large screen mosaic display system.

The said focusing lenses in FIG. 5, 503, FIG. 6, 602, FIG. 7, 703, and FIG. 9, 906, and the said projection lenses in FIG. 5, 515, and FIG. 6, 604, can be respectively comprise by two or more pieces of lenses to obtain the good optical characteristics display devices.

What is claimed is:

1. An OutSide-Active-Matrix LCD (OAM-LCD), comprising:

a first and a second transparent substrate placed alongside and spaced part from each other, the two substrates having internal surfaces facing each other and outside surfaces, each of the outside surfaces being on the other side of a substrate from the internal surface of such substrate;

one or more transparent electrodes deposited on the internal surface of the first substrate;

a LC layer between the two substrates;

a separated electrode array deposited on the internal surface of said second substrate, forming a display matrix with the transparent electrodes deposited on the internal surface of the first substrate;

a series of thin conductive leads in said second substrate;

a series of conductive leads deposited on the outside surface of said second substrate;

an active matrix circuit deposited on the outside surface of the second substrate, said active matrix being deposited immediately adjacent to said conductive leads;

each of said thin conductive leads has two connecting ends, one of which being connected with one of said related separated electrode deposited on the internal surface of the second substrate and the other being connected with one of said conductive leads deposited on the outside surface of the second substrate, through which said thin conductive leads make connection with the outside-active-matrix;

means for driving the LCD by means of said outside-active-matrix.

2. The device of claim 1, wherein the outside-active-matrix is constructed using conventional electronic devices comprising conventional transistors, diodes, ICs, thick film circuit, thin film circuit, and hybrid circuit.

3. The device of claim 1, wherein the outside-active-matrix may further comprise a variety of high quality and high speed components to achieve a fast LCD response time.

4. The device of claim 3 wherein the high quality components have high operating voltages in a range from 5 to 500 volts.

5. The device of claim 1, wherein each of the thin conductive leads may be further made of multi-leads to secure its connection with the separated electrode deposited on the internal surface of the second substrate to guarantee the reliability of the electrical connection between the separated electrode array and the outside-active-matrix.

6. The device of claim 1, wherein the conductive leads and the outside-active-matrix are deposited on the outside surface of the second substrate, said device further comprising a single layer or a multi-layer of PCB to connect the separated electrode array and the outside-active-matrix.

7. The device of claim 1, wherein the first or the second substrate has a filter array on the internal surface or outside surface to obtain a multi-color or a full-color display.

8. The device of claim 1, wherein the first or the second substrate further comprises a polarizer located at its outside surface.

9. A reflective OAM-LCD, comprising:

a transparent face substrate and a back substrate placed alongside and spaced apart from each other, the two substrates having internal surfaces facing each other and outside surfaces, each of the outside surfaces being on the other side of a substrate from the internal surface of such substrate; one or more transparent electrodes deposited on the internal surface of said face substrate;

a LC layer;

a series of separated electrodes deposited on the internal surface of said back substrate, forming a display matrix with the transparent electrodes deposited on the internal surface of the face substrate;

a series of thin conductive leads deposited on the outside surface of said back substrate;

an active matrix circuit deposited on the outside surface of said back substrate;

wherein each of the thin conductive leads has two connecting ends, one of which being connected with a related electrode deposited on the internal surface of the back substrate and the other being connected with the conductive lead deposited on the outside surface of the back substrate through which the thin conductive leads make connection to the outside-active-matrix circuit;

a polarizer at or near the outside surface of the face substrate;

means for driving of the LCD by said outside-active-matrix circuit.

10. The device of claim 9 wherein the electrodes are transparent electrodes, said device further comprising a reflective plate at the back of said back substrate to reflect incident light.

11. The device of claim 9, wherein the electrodes on the internal surface of the back substrate are reflective electrodes, and wherein the reflective electrodes have a monochromic or a multi-color or R, G, B fluorescent material to obtain a higher contrast monochromic or multi-color or full-color display.

12. A scattering OAM-LCD, comprising:

a parallel light backlight emitting parallel incident light;

a focusing lens array plate having a series of focusing lens, each focusing lens comprises of one or more lenses;

a scattering LCD, comprising:

a transparent back substrate and face substrate placed alongside and spaced apart from each other, the two substrates having internal surfaces facing each other and outside surfaces, each of the outside surfaces being on the other side of a substrate from the internal surface of such substrate;

a separated transparent electrode first array deposited on the internal surface of said back substrate;

a second array of transparent electrodes deposited on the internal surface of said face substrate, forming a display matrix with said electrodes in said first array deposited on the internal surface of the back substrate;

a scattering LC layer between the two arrays and the two substrates;

means for focusing said parallel incident light emitted from said backlight on the outside surface of said back substrate to form a series of focus points by said focusing lens array;

a series of conductive leads deposited on the outside surface of said back substrate between said focus points;

an outside-active-matrix circuit deposited on the outside surface of said back substrate between focus points, and connected with said conductive leads;

a projection lens array plate having a series of projection lenses located at the front of said scattering LCD, each projection lens comprises of one or more lenses;

a black aperture array plate having a series of apertures located at the front of the projection lens array plate;

said apertures being aligned with the related projection lenses, focusing lenses and separated electrodes so that light originally from the backlight through the focus points, the scattering LC layer and focused by the projection lens array plate will pass through the apertures;

a face plate located at the front of the aperture array plate having some optical structure for adjusting the viewing angle and the direction of the output light and for obtaining the high brightness and high contrast of the display image;

means for applying the ON operating voltage to the scattering LCD, so that the LCD is in a transparent state, and so that the incident light from the focusing lens can go through the LCD, and then focused in the aperture by the projection lens, and through the aperture to face plate as output from the device in the ON state;

means for applying the OFF operating voltage to the scattering LCD, so that the LCD is in a scattering state, and so that the incident light from the focusing lens is scattered by the LCD, wherein the most part of this scattered light will be absorbed by the black aperture plate, and a small part of them can go through the small aperture as output from the device in the OFF state;

means for modulating the intensity of the output light according to data signal in order to display an image, using the ON state and OFF state.

13. A scattering OAM-LCD, having only one lens for one image dot, comprising:

a parallel light backlight to emit the parallel light;

a scattering LCD, comprising:

a transparent back substrate and face substrate placed alongside and spaced apart from each other, the two substrates having internal surfaces facing each other and outside surfaces, each of the outside surfaces being on the other side of a substrate from the internal surface of such substrate;

a first array of one or more transparent electrodes on the internal surface of the back substrate;

a second separated transparent electrode array on the internal surface of the face substrate, forming a display matrix with said transparent electrodes on the back substrate;

a face plate located so that the LCD is between the face plate and the backlight;

a black aperture array plate between the face plate and the LCD;

said facing plate having optical structures for adjusting the viewing angle and the direction of the output light and for obtaining the high brightness and high contrast of display image;

means for focusing the light emitted from the backlight on the outside surface of the face substrate at focus points;

a series of conductive leads are deposited on the outside surface of the face substrate between the focus points;

an outside-active-matrix on the outside surface of the face substrate between the focus points;

a series of thin conductive leads in the face substrate, each of the thin conductive leads has two connecting ends and one of which is connected to a related separated electrode, and the other end is connected with the conductive leads and then to the outside-active-matrix;

a series of chambers located at the black aperture array plate between focus points neighboring the LCD to hold the components of the active-matrix;

said apertures being respectively aligned along a common optical axis with the related focusing lenses and the separated electrodes;

means for applying the ON operating voltage to the scattering LCD, so that the LCD is in a transparent state, and the incident light from the focusing lens can go through the LCD, and then focused in the aperture by the focusing lens, and through the aperture through the face plate as output from the device in an ON state;

means for applying the OFF operating voltage to the scattering LCD, so that the LCD is in a scattering state, and the incident light from the focusing lens is scattered by the LCD, wherein most of this scattered light will be absorbed by the black aperture plate, and only a small part of the light can go through the small aperture as output from the device in an OFF state;

means for modulating the intensity of the output light according to the data signal and to display an image, using the ON state and OFF state.

14. The device of claim 13, wherein the scattering LCD is a Polymer Dispersed LCD ("PDLCD")

15. The device of claim 13, wherein the scattering LCD layer includes a black dye to decrease the scattering light intensity of the scattering state of the LCD, and to increase the contrast of the display.

16. The device of claim 13, wherein the face plate includes a holographic film or a lens array for adjusting the viewing angle and the direction of the output light to obtain a high level of contrast of the display image.

17. The device of claim 13, wherein the back substrate or the face substrate includes a monochromic, multi-color or R, G, B color filter array deposited on the internal surface or the outside surface, to obtain the monochromic, multi-color or full-color displays.

18. The device of claim 13, wherein the parallel light backlight comprises a diffusing flat light source, and a holographic film to convert diffusing light into parallel light.

19. The device of claim 18, wherein the diffusing flat light source includes R, G, B cold cathodes or hot cathode fluorescent lamps for the generation of red, green and blue pulse light sequentially in response to display signals so as to generate a full-color image without color filter.

20. The device of claim 13, wherein the parallel light backlight further comprises an optional optical fiber plate to convert the diffusing light to the parallel light.

21. The device of claim 13, wherein the apertures have sizes in a range from $1/100$ to $1/2$ of the pixel pitch to increase the contrast of the display image.

22. The device of claim 13, wherein the distance between the said scattering LCD and the said aperture is in a range from $1/10$ to 100 times of the pixel pitch to increase the contrast of the display image.

23. The device of claim 13, wherein the backlight further comprises of a point light source and a parabolic or elliptical reflector and/or a Fresno lens or a lens plate, and IR, UV absorbing plate.

24. The device of claim 13, wherein the backlight further comprises of a line light source and a parabolic or elliptical cylindrical reflector and/or a Fresnal lens or a lens plate and a series of slit apertures, which are paralleled with the line light sources.

25. The device of claim 13, wherein the backlight comprises a high intensity point light source and a series of optical fibers, to generate the parallel light.

26. The device of claim 13, wherein the backlight comprises several light sources and a brightness auto-adjust circuit for adjusting the brightness uniformity.

27. The device of claim 13, wherein the backlight further comprises R, G, B line light sources each line light source corresponding to a pixel line of pixel dots for providing a line of image dots in the large screen or mosaic super large screen full-color display.

28. A method of achieving high brightness and high efficiency color display without color filter, employing a device comprising:

an OAM-LCD divided into groups of lines, said OAM-LCD including an active-matrix circuit on an outside surface for driving the lines;

a backlight comprises a R, G, B color sequential pulse light source;

said method comprising:

(a) applying electrical signals to said circuit to sequentially address each of the lines in a group to cause LCD cells in each line to reach transmission saturation state;

(b) causing one of R, G or B color light to be emitted by the source and passed through a line when LCD cells in such line reaches transmission saturation state to generate an image of said one of the colors;

(c) repeating steps (a), (b) for generating images of the remaining two colors of R, G, or B color light; and (d) repeating steps (a), (b), (c) in order to provide a full color image.

29. The method of claim 28, wherein the LCD is a PDLCD said method further comprising modulating the intensity of the output light by analogy or digital derived according to data signal.

30. A mosaic OAM-LCD, used for assembling a large screen or super large screen display, comprising:

an array of OAM-LCDs, used for assembling the large screen or super large screen display, each OAM-LCD comprising:

a parallel light backlight;

an LCD with a layer of LC cells, an outside-active-matrix and conductive leads for driving the LCD cells;

a projection lens array having a series of projection lenses, each projection lens comprising one or more lenses;

a black aperture array plate, said lenses focusing light from said backlight towards the LC cells and apertures in the aperture array plate;

means for assembling said array to form a large screen or super large screen display.

31. The device of claim 30, wherein the projection lens array plate and/or face plate can be no used to further comprising a face plate for an assembled mosaic display screen.

32. The device of claim 30, wherein the array of OAM-LCDs share a continuous face plate and/or a continuous aperture plate for an assembled mosaic display screen.

33. An outside-active-matrix LCD (OAM-LCD), comprising:

a first and a second transparent substrate placed alongside and spaced apart from each other, the two substrates having internal surfaces facing each other and outside surfaces, the outside surface of each substrate being on the other side of such substrate from its internal surface;

a liquid crystal (LC) layer between the two substrates;

a first array of one or more transparent electrodes between the internal surface of the first substrate and the LC layer;

a second separated electrode array between the LC layer and the internal surface of said second substrate, one of or the two arrays forming a display matrix;

an active matrix circuit at or near the outside surface of the second substrate;

means for electrically connecting at least some of the electrodes in the second array to said active matrix circuit;

means for applying electrical potentials to the two arrays to drive the LCD by means of said active matrix circuit.

34. The device of claim 33, said electrically connecting means including conductive leads, each of at least some of said conductive leads electrically connecting a corresponding electrode in the second array to the circuit.

35. The device of claim 33, said second array being an array of dot electrodes.

36. The device of claim 33, wherein the outside-active-matrix circuit comprises components operable in a voltage range up to about 500 volts.

37. The device of claim 33, wherein said electrically connecting means includes a single layer or a multi-layer of PCB connecting the electrodes of the second array and the circuit.

38. The device of claim 33, wherein the first or the second substrate includes a filter array to obtain a multi-color or a full-color display.

39. The device of claim 33, wherein the first and/or the second substrates further comprises a polarizer facing its outside surface.

40. The device of claim 33, said second array of separated electrodes having light reflective surfaces.

41. The device of claim 40, wherein the reflective electrodes have a monochromic or a multi-color or R, G, B fluorescent material to obtain a higher contrast monochromic or multi-color or full-color display.

42. The device of claim 33, wherein said second array of the electrodes are transparent electrodes, said device further comprising a reflective plate facing the outside surface of the second substrate to reflect incident light towards the LC layer.

43. The device of claim 33, said LC layer being substantially transparent when the applying means causes the circuit and the two arrays to apply an ON signal to the layer, and said LC layer being substantially opaque because of light scattering in the layer when the applying means causes the circuit and the two arrays to apply an OFF signal to the layer, said device being a scattering LCD, said device further comprising:

a parallel light backlight to emit parallel incident light towards the outside surface of the first substrate;

a black aperture plate having an array of apertures for controlling light from the backlight through the LC layer; and at least one focusing lens array between the backlight and the aperture array plate and having a series of focusing lens, each focusing lens comprising one or more lenses for focusing said parallel incident light emitted from said backlight through the LC layer when it is transparent and through the apertures along paths unimpeded by the circuit.

44. The device of claim 43, further comprising a face plate located at the front of the aperture array plate having some optical structure for adjusting the viewing angle and the direction of the output light and for obtaining the high brightness and high contrast of the display image.

45. The device of claim 43, further comprising means for modulating the intensity of the output light according to the data signal and to display the image, using the ON state and OFF state.

46. The device of claim 43, said lenses focusing light from the backlight on the outside surface of said second substrate to form a series of focus points by said focusing lens array.

47. The device of claim 46, said circuit comprising components on the outside surface of said second substrate between focus points.

48. The device of claim 46, further comprising a second focusing lens array having an array of focusing lenses, each focusing lens of the second array comprises one or more lenses for focusing the light from said focus points along said paths towards the apertures.

49. The device of claim 46, said circuit comprising components on the outside surface of said second substrate, said first substrate defining therein an array of chambers between focus points to hold the components.

50. The device of claim 43, said circuit comprising components on the outside surface of said second substrate, said electrically connecting means comprising conductive leads each connecting a component to a separated electrode in the second electrode array.

51. The device of claim 43, said second electrode array including an array of dot electrodes, wherein for at least some dot electrodes, each dot electrode is aligned with a focusing lens and an aperture along one of said paths for displaying one image dot.

52. The device of claim 33, wherein the scattering LCD is a Polymer Dispersed LCD ("PDLCD").

53. The device of claim 33, wherein the scattering LCD layer includes a black dye to decrease the scattering light intensity of the scattering state of the LCD, and to increase the contrast of the display.

54. The device of claim 33, wherein the face plate includes a holographic film or a lens array for adjusting the viewing angle and the direction of the output light to obtain a high level of contrast of the display image.

55. The device of claim 33, wherein the back substrate or the face substrate includes a monochromic, multi-color or R, G, B color filter array deposited on the internal surface or the outside surface, to obtain the monochromic, multi-color or full-color displays.

56. The device of claim 33, said device including a parallel backlight that comprises a diffusing flat light source, and a holographic film to convert diffusing light into parallel light.

57. The device of claim 56, wherein the diffusing flat light source includes R, G, B cold cathode or hot cathode fluorescent lamps for the generation of red, green and blue pulse light sequentially in response to display signals so as to generate a full-color image without color filter.

58. The device of claim 33, said device including a parallel backlight that comprises an optional optical fiber plate to convert the diffusing light to the parallel light.

59. The device of claim 33, said device further comprising an aperture plate between the LC layer and the second substrate, wherein the aperture sizes in a range from $1/100$ to $1/2$ of the pixel pitch to increase the contrast of the display image.

60. The device of claim 33, said device further comprising an aperture plate between the LC layer and the second substrate, wherein the distance between the LC layer and the said aperture plate is in a range from $1/10$ to 100 times of the pixel pitch to increase the contrast of the display image.

61. An outside-active-matrix LCD (OAM-LCD), comprising:

a first and a second transparent substrate placed alongside and spaced apart from each other, the two substrates having internal surfaces facing each other and outside surfaces, the outside surface of each substrate being on the other side of such substrate from its internal surface;

a liquid crystal (LC) layer between the two substrates;

at least one focusing lens array having a series of focusing lens, each focusing lens comprising one or more lenses for focusing parallel incident light from a backlight source toward the device through the LC layer when it is transparent, said lenses focusing light from the backlight on the outside surface of said second substrate to form a series of focus points by said focusing lens array;

an active matrix circuit at or near the outside surface of the second substrate, said circuit comprising components on the outside surface of said second substrate between focus points.

62. The device of claim 61, said circuit comprising components on the outside surface of said second substrate, said first substrate defining therein an array of chambers between focus points to hold the components.

* * * * *

UNITED STATES PATENT AND TRADEMARK OFFICE
CERTIFICATE OF CORRECTION

PATENT NO. : 5,510,915
DATED : April 23, 1996
INVENTOR(S) : Shichao Ge et al.

It is certified that error appears in the above-indentified patent and that said Letters Patent is hereby corrected as shown below:

The Title Page [54]; Column 1, Lines 29, 48; Column 3, Lines 21, 22, 24, 34, 37, 40, 56, 63; Column 4, Lines 11, 12, 19, 39, 45, 56; Column 6, Line 36; Column 7, Lines 34, 36, 54; Column 8, Lines 23, 30:

Replace: "Out-active-matrix" with --Outside-active-matrix--

The Title Page [56] FOREIGN PATENT DOCUMENTS
   replace: "2067688" with 0267688

Column 2, SUMMARY OF THE INVENTION, Line 1 replace:
   "OAM-LCD can also be made as reflective LCD or trans-" with --OAM-LCD can also be made as reflective ROAM-LCD or trans--

Column 2, SUMMARY OF THE INVENTION, Line 25 replace:
   "mosaic large screen and supper large screen video display." with --mosaic large screen and super large screen video display.--

UNITED STATES PATENT AND TRADEMARK OFFICE
CERTIFICATE OF CORRECTION

PATENT NO. : 5,510,915
DATED : April 23, 1996
INVENTOR(S) : Shichao Ge et al.

It is certified that error appears in the above-indentified patent and that said Letters Patent is hereby corrected as shown below:

In Column 2, SUMMARY OF THE INVENTION, Line 29 replace:
"fast LCD. Because the out-active-matrix cm be constructed" with --fast LCD. Because the outside-active-matrix can be constructed--

In Column 2, BRIEF DESCRIPTION OF THE DRAWINGS, Line 44-45 replace:
"FIG. 2 is a cross-sectional view of a portion of an OAM-LCD of this invention;" with --FIG. 2 is a cross-sectional view of a portion of a transmission OAM-LCD of this invention;

In Column 3, DETAILED DESCRIPTION OF THE PREFERRED EMBODIMENT, Line 13 replace:
"view of the portion of the OAM-LCD of this invention." with --view of the protion of the transmission OAM-LCD of this invention.--

In Column 3, DETAILED DESCRIPTION OF THE PREFERRED EMBODIMENT, Line 30-31 replace:
"tive leads 209 has two connecting ends. One of the connecting end is connected with a related transparent dot" with --tive leads 209 has two connecting ends. One of the connection ends is connected with a related transparent dot--

UNITED STATES PATENT AND TRADEMARK OFFICE
CERTIFICATE OF CORRECTION

PATENT NO. : 5,510,915
DATED : April 23, 1996
INVENTOR(S) : Shichao Ge et al.

It is certified that error appears in the above-indentified patent and that said Letters Patent is hereby corrected as shown below:

In Column 4, DETAILED DESCRIPTION OF THE PREFERRED EMBODIMENT, Line 34 replace:
"502 emitted from backlight 501 are focused on the outside" with --502 emitted from backlight 501 is focused on the outside- In Column 4, DETAILED DESCRIPTION OF THE PREFERRED EMBODIMENT, Line 49 replace:
"fast response time of LCD. For example, the operating" with --fast response time of LCD. For example, using the operating--

In Column 4, DETAILED DESCRIPTION OF THE PREFERRED EMBODIMENT, Line 55 replace:
"other is connected with the conducive lead 508 and then with" with --other is connected with the conductive lead 508 and then with--

In Column 4, DETAILED DESCRIPTION OF THE PREFERRED EMBODIMENT, Lines 60 and 62 replace:

"have" with --has--

UNITED STATES PATENT AND TRADEMARK OFFICE
CERTIFICATE OF CORRECTION

PATENT NO. : 5,510,915
DATED : April 23, 1996
INVENTOR(S) : Shichao Ge et al.

It is certified that error appears in the above-indentified patent and that said Letters Patent is hereby corrected as shown below:

In Column 5, DETAILED DESCRIPTION OF THE PREFERRED EMBODIMENT, Lines 46-47 replace:
"(scattering state), the LC layer will be darken because the black dye, and hence the background brightness of the OFF" with --(scattering state), the LC layer will be darkened because of the black dye, and hence the background brightness of the OFF--

In Column 5, DETAILED DESCRIPTION OF THE PREFERRED EMBODIMENT, Lines 65-66 replace:
"can be comprised the R, G, and B color point light sources and/or the R, G, B line light sources, which can be arranged" with --can be comprised of the R, G, and B color point light sources and/or the R, G and B line light sources, which can be arranged--

In Column 7, DETAILED DESCRIPTION OF THE PREFERRED EMBODIMENT, Line 21 replace:
"707 is a LC layer. 708 is a transparent face substrate of the" with --707 is an LC layer. 708 is a transparent face substrate of the--

UNITED STATES PATENT AND TRADEMARK OFFICE
CERTIFICATE OF CORRECTION

PATENT NO. : 5,510,915
DATED : April 23, 1996
INVENTOR(S) : Shichao Ge et al.

It is certified that error appears in the above-indentified patent and that said Letters Patent is hereby corrected as shown below:

In Column 7, DETAILED DESCRIPTION OF THE PREFERRED EMBODIMENT, Line 38 replace:
"structure of the display, the face plate 716 can be no used." with --structure of the display, the face plate 716 cannot be used--

In Column 8, DETAILED DESCRIPTION OF THE PREFERRED EMBODIMENT, Line 14 replace:
"trode array 912 and the transparent electrodes. 908 forms the" with --trode array 912 and the transparent electrodes. 909 forms the--

In Column 8, DETAILED DESCRIPTION OF THE PREFERRED EMBODIMENT, Line 18 replace:
"901 are focused on the outside surface of face substrate 911." with --901 is focused on the outside surface of face substrate 911.--

In Column 8, DETAILED DESCRIPTION OF THE PREFERRED EMBODIMENT, Lines 23 and 25 replace: "R, G, B" with --R, G and B--

UNITED STATES PATENT AND TRADEMARK OFFICE
CERTIFICATE OF CORRECTION

PATENT NO. : 5,510,915
DATED : April 23, 1996
INVENTOR(S) : Shichao Ge et al.

It is certified that error appears in the above-indentified patent and that said Letters Patent is hereby corrected as shown below:

In Column 8, DETAILED DESCRIPTION OF THE PREFERRED EMBODIMENT, Lines 31-32 replace:
"820 is a series of chambers in the black aperture plate 913 between R, G, B line groups or/and focus point neighboring" with --920 is a series of chambers in the black aperture plate 913 between R, G and B line groups and/or focus point neighboring--

In Column 8, DETAILED DESCRIPTION OF THE PREFERRED EMBODIMENTS, Lines 37-39 replace:
"FIG 5, 515, and FIG.6, 604, can be respectively comprise by two or more pieces of lenses to obtain the good optical characteristics display devices." with --"FIG 5, 515, and FIG.6, 604, can respectively comprise two or more pieces of lenses to obtain the good optical characteristics of display devices.--

In Column 8, Line 45 in Claim 1 replace:
"and spaced part from each other, the two substrates" with --and spaced apart from each other, the two substrates--

UNITED STATES PATENT AND TRADEMARK OFFICE
CERTIFICATE OF CORRECTION

PATENT NO. : 5,510,915
DATED : April 23, 1996
INVENTOR(S) : Shichao Ge et al.

It is certified that error appears in the above-indentified patent and that said Letters Patent is hereby corrected as shown below:

In Column 13, Lines 24-27 in Claim 31 replace:
"31. The device of claim 30, wherein the projection lens array plate and/or face plate can be no used to further comprising a face plate for an assembled mosiac display screen." with --31. The device of claim 30, further comprising a face plate for an assembled mosiac display screen.--

In Column 15, Lines 28-29 in Claim 58 replace:
"58. The device of claim 33, said device including a parallel backlight that comprises an optional optical fiber" with --58. The device of claim 33, said device further includes a parallel backlight that further comprises an optional optical fiber--

In Column 15, Line 33 in Claim 59 replace:
"substrate, wherein the aperture sizes in range from 1/100 to" with

UNITED STATES PATENT AND TRADEMARK OFFICE
CERTIFICATE OF CORRECTION

PATENT NO. : 5,510,915
DATED : April 23, 1996
INVENTOR(S) : Shichao Ge, et al

It is certified that error appears in the above-indentified patent and that said Letters Patent is hereby corrected as shown below:

-- substrate, wherein the apertures have sizes in range from 1/100 to --

Signed and Sealed this

Sixteenth Day of September, 1997

Attest:

BRUCE LEHMAN

Attesting Officer      Commissioner of Patents and Trademarks